E. K. BAKER.
DEMOUNTABLE WHEEL RIM.
APPLICATION FILED JUNE 13, 1910.
1,095,775.
Patented May 5, 1914.
2 SHEETS—SHEET 1.
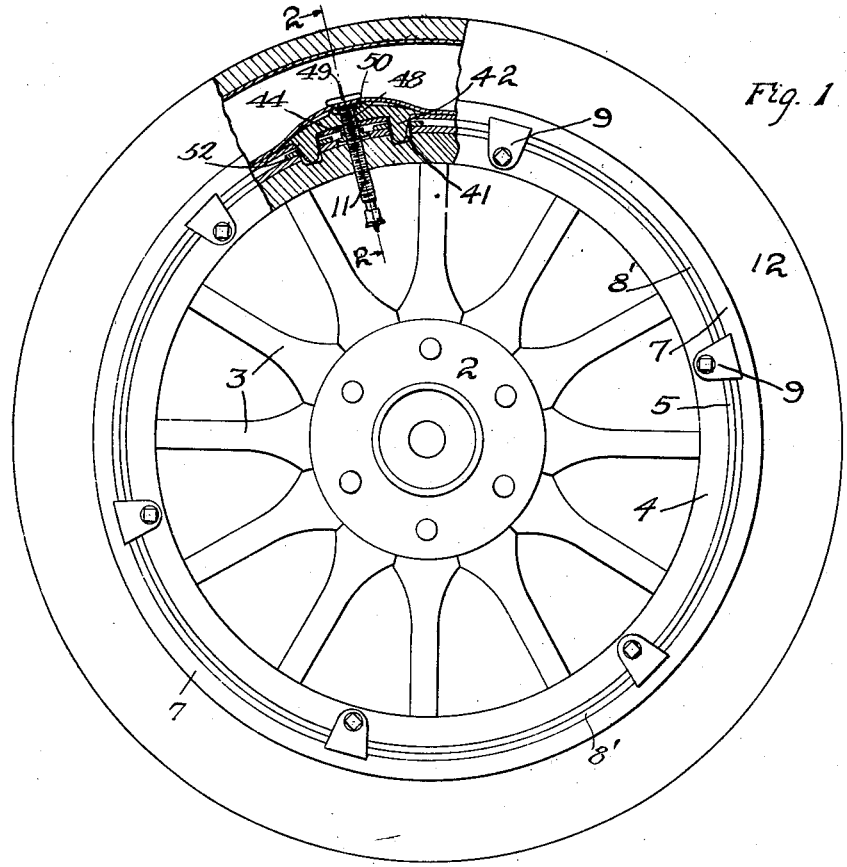
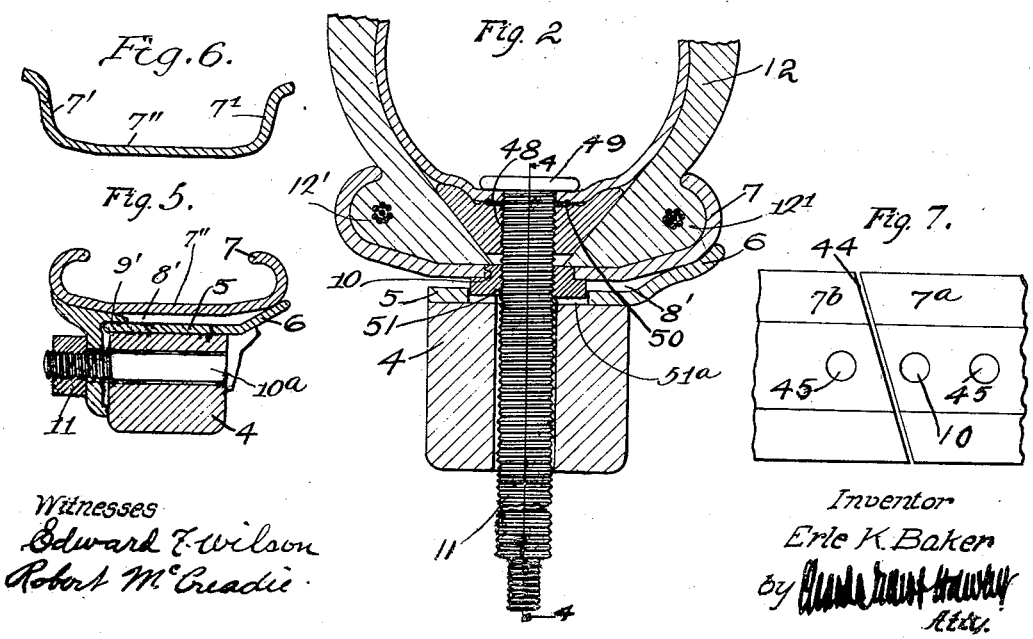
Witnesses
Edward F. Wilson
Robert McCreadie
Inventor
Eric K. Baker
by [signature]
Atty.

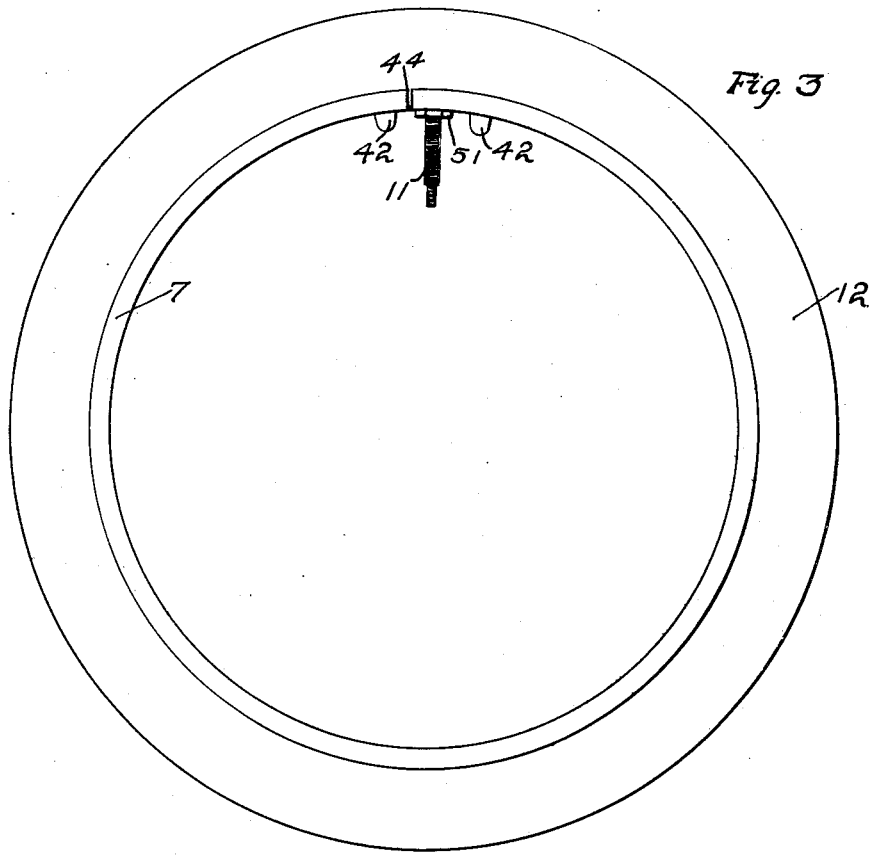
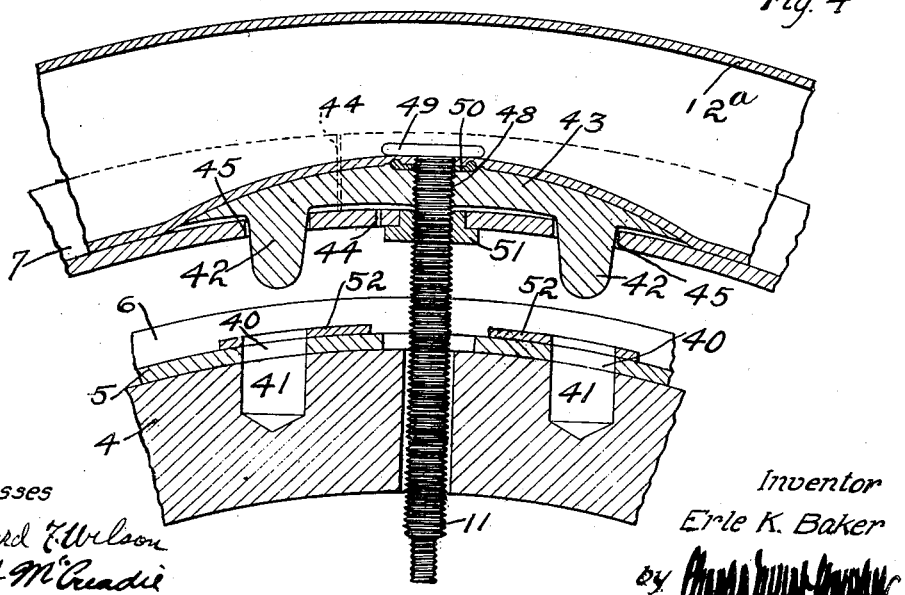

UNITED STATES PATENT OFFICE.

ERLE K. BAKER, OF CHICAGO, ILLINOIS, ASSIGNOR TO UNIVERSAL RIM COMPANY, OF CHICAGO, ILLINOIS, A CORPORATION OF ILLINOIS.

DEMOUNTABLE WHEEL-RIM.

1,095,775.  Specification of Letters Patent.  Patented May 5, 1914.

Application filed June 13, 1910. Serial No. 566,605.

*To all whom it may concern:*

Be it known that I, ERLE K. BAKER, a citizen of the United States, and a resident of Chicago, Cook county, Illinois, have invented certain new and useful Improvements in Demountable Wheel-Rims, of which the following is a full, true, clear, and exact description, such as will enable others skilled in the art to make and use the same.

My invention relates to improvements in demountable tire-carrying rims of the kind which are somewhat larger than the automobile wheels with which they are designed to be used and which are secured to their wheels by means of clamping wedge devices, usually called wedge lugs, which wedge between the rim and the wheel periphery to hold the rim away from said periphery and yet firmly secure it in place upon the wheel. Such demountable rims are often referred to as bolted on rims because the wedge lugs are secured and operated by transverse bolts in the felly of the wheel.

Heretofore it has been necessary to make such bolted on rims in the form of endless rings to withstand the expanding strains of the wedge lugs. For automobile tires having stretchable base beads it has been customary to provide these endless rims with endless integral flanges of the clencher type whereas when such rims were intended to receive tires having non-stretchable base beads it has been thought necessary to make the rims in two or more parts arranged to secure the tire between them, one part being the rim proper and the other a detachable flange for the outer edge thereof. Rims of the first form are objectionable because their use is limited to one type of tire and indeed a type which is fast going out of use, and rims of the second kind are objectionable because of their excessive weight, because they are slow to operate, because loose outside rings frequently blow off with disastrous results, and because they are expensive to make and assemble.

The object of my invention is to provide a one piece demountable rim of the class here defined which shall have integral tire retaining flanges and nevertheless shall be adapted for use with tires of all descriptions including such as have non-stretchable base beads.

With this object in view my invention consists generally in an integrally flanged demountable rim of the class described, which is transversely split or open at one point in its circumference in combination with a metal plate extending across the split in the rim and positively though detachably connecting the ends of the rim whereby two principal things are accomplished, to wit the rim, while the plate connects its ends forms a practically continuous or endless rim well adapted to withstand the expanding strains of the clamping devices upon the wheel; and, when the ends of the rim are disconnected the rim readily may be contracted and either placed in or removed from the tire.

My invention also consists in various novel details of construction and in combinations of parts all as hereinafter described and particularly pointed out in the claims.

The invention will be more readily understood by reference to the accompanying drawings forming a part of this specification, and in which—

Figure 1 illustrates an automobile wheel and tire equipped with a demountable rim embodying my invention; Fig. 2 is an enlarged radial section on the line 2—2 of Fig. 1; Fig. 3 is a side view of my novel rim with the tire thereon, as it appears when demounted from the wheel; Fig. 4 is a vertical longitudinal section as on the line 4—4 of Fig. 2, but showing the rim raised off the wheel; Fig. 5 is a cross section through one of the wedge lugs; Fig. 6 shows a modified cross section of my novel rim; and, Fig. 7 is a detail view of the rim ends disclosing the manner in which the otherwise endless rim is transversely split or opened to facilitate putting the rim into and taking it out of tires.

Rims and wheels of the kind here referred to are generally characterized by making the rim as large in circumference as the tire will permit and by making the circumference of the wheel considerably less than that of the rim so that an annular or circumferential space or groove is left between the rim and the wheel for the reception of the bolting-on devices or clamps. Thus in the form of my invention which is disclosed in the drawings the circumference of the rim 7 is determined by the base beads 12' of the tire 12, and the automobile wheel is enough smaller to leave an annular groove or space 8' between the rim and the periphery of the wheel. The wheel comprises a hub 2, spokes 3, felly 4 and felly band or periphery 5.

9, 9 are the wedge lugs presenting their wedge points 9' in the space 8' and which usually co-act with an inclined clamping flange 6 on the inner edge of the felly band. These wedge lugs are operated by bolts 10, having nuts 11 and they serve to securely clamp the rim on the wheel. As shown there are several (preferably six) wedge lugs or clamping devices. I claim nothing new in these particular wedge lugs or in the manner in which they center a rim upon the wheel and clamp it thereto. The novel clamping devices originally shown but not now shown in this case are described and claimed in my co-pending application Serial No. 636,693, filed July 3rd, 1911, which is a continuation, and in the nature of a division of this case.

This present invention is concerned with the provision of a rim which shall be adapted for use with fastening devices of the herein described kind and yet be free from the disadvantages of all rims previously used with such fastening devices. To this end I employ a rim 7 of a cross section determined by the shape of the tire to be used, as indicated in Figs. 5 and 6. This rim is provided with tire holding flanges which, whatever their shape, are integral with the cylindrical body portion 7" of the rim. As well shown in Figs. 1, 2, 4 and 7 this integrally flanged metal rim is in one piece and presents a single transverse split or cut 44; that is the rim is cut apart or open at one point. I prefer that the cut 44 shall be arranged diagonally instead of straight across the rim for in this way I adapt the rim ends 7$^a$ and 7$^b$ to easy lateral separation. By separating the ends in this manner the rim is distorted into helical form which reduces its effective circumference without much force and allows the rim to be easily put into or taken out of a tire. But whatever the position of the straight cut 44 such splitting of the rim makes it possible to mount and demount non-stretchable bead tires on this integrally flanged and very simple rim. The rim having been thus split I adapt it for use in connection with the wedge lugs or fasteners by connecting the ends of the rim in such manner as to positively tie them together against expansion while at the same time make the connector in such manner that it may be easily disengaged at times when the rim is to be placed in or taken out of a tire. Thus for example I employ a metal plate 43 which extends across the split 44 in the rim and is provided with studs 42, 42 which project through holes 45 provided therefor in the ends of the rim adjacent to the split, (see Figs. 3, 4 and 7). One end of the rim contains a valve stem hole 10 adjacent to the split and the plate or block 43 contains a corresponding valve stem hole 48. The valve stem 11 attached to the inner tube 12$^a$ of the tire by means of the usual stem head 49 and washer 50 therefore passes through the holes 48 and 10, adjacent to the split 44 and between the studs 42. For holding the plate 43 in definite position on the rim ends I preferably use a locking nut 51, and for a purpose about to be described I provide this nut with a boss which occupies the valve stem hole 10$^a$. The studs 42, 42 are longer than the distance across the annular space 8' and are accommodated in holes 40, 41 in the felly band and felly of the wheel. When the parts are assembled I thus form a driving connection between the rim and the wheel to insure the rotation of the rim with the wheel. Referring to Figs. 2 and 4 it will be noted that the wheel felly band contains a hole 51$^a$ which is larger than the valve stem. When the parts are assembled the nut 51 occupies this hole 51$^a$ and furnishes another driving connection between the wheel and the rim, it being clear that at such times the nut constitutes an effective dowel between the rim and the felly band. And to aid in supporting the rim ends on the felly band I preferably apply spacing plates 52 to the felly band adjacent to the holes 40 therein. With the parts in the condition shown in Fig. 4 the plate 43 may be disengaged from the rim ends by loosening the nut 51 and pushing the plate away from the rim, whereupon the rim ends and the rim may be disengaged from the tire in the manner hereinbefore described.

The structure herein shown may be variously modified without departing from the spirit of my invention.

The specific diagonal formation of the rim ends with valve stem hole disclosed in Fig. 7 is not claimed in this application but is described and claimed in my co-pending application Serial No. 641,494, filed July 31st, 1911.

Having thus described my invention I claim as new and desire to secure by Letters Patent.

1. A one piece integrally flanged demountable rim of the bolted-on class described and transversely split at one point only in its circumference, in combination with a plate extending across said split and positively and non-adjustably but detachably connecting the ends of the rim, for the purposes specified.

2. A one piece integrally flanged demountable rim of the bolted-on class described and transversely split at one point in its circumference, in combination with a one piece combined driver and rim end connector extending across said split and positively but detachably connecting the ends of the rim, for the purposes specified.

3. A one piece integrally flanged demountable rim of the class described and transversely split at one point in its circumference and having a valve stem hole adjacent to its split, in combination with a plate having a corresponding valve stem hole and extending across said split and positively but detachably connecting the ends of the rim, for the purposes specified.

4. A one piece integrally flanged demountable rim of the bolted on class described and transversely split at one point in its circumference and having a valve stem hole adjacent to its split, in combination with a one piece combined driver and rim end connector having a corresponding valve stem hole and extending across said split and positively but detachably connecting the ends of the rim, for the purposes specified.

5. A one piece integrally flanged demountable rim transversely split at one point in its circumference and having a valve stem hole, in combination with a one piece combined driver and rim end connector having a corresponding valve stem hole and extending across said split and positively but detachably connecting the ends of the rim, for the purposes specified.

6. A one piece integrally flanged demountable rim of the bolted-on class described and transversely split at one point only in its circumference, in combination with a combined rim end connector and driver positively but detachably connecting the ends of the rim, for the purposes specified.

7. An integrally flanged demountable rim of the bolted-on class described open at one place and presenting straight cut rim ends, in combination with a rim end connecting plate adapted to hold the rim against expansion by the bolting-on devices and containing a valve stem hole, for the purposes specified.

8. A one piece integrally flanged demountable rim of the bolted-on class described and transversely split at one point in its circumference, in combination with a rim end connecting plate normally positioned against said ends and extending across said split, and the rim ends being formed to co-act with said plate as a rim driver.

9. A one piece integrally flanged demountable rim of the bolted-on class described, transversely split at one point only in its circumference and presenting straight cut non-interlocking opposed rim ends, and means on said ends positively but detachably connecting the same to render the rim inexpansible by the bolting-on devices, for the purposes specified.

10. A one piece integrally flanged demountable rim of the class described and transversely split at one point in its circumference, in combination with a separable plate extending across said split upon the outer periphery of said rim and positively but detachably connecting the ends of the rim, for the purposes specified.

11. A one piece integrally flanged demountable rim of the class described and transversely split or open at one point in its circumference, in combination with a separable plate extending across said split, holding the rim ends in abutment and positively and non-adjustably but detachably connecting said ends, for the purposes specified.

12. A one piece integrally flanged transversely split demountable rim of the class described and having a valve stem hole containing a driver, in combination with means positively but detachably connecting the ends of the rim, a tire on said rim and a valve stem extending through said driver, for the purposes specified.

13. A one piece integrally flanged transversely split demountable rim of the bolted-on class described, having holes in its ends adjacent to its split, in combination with a plate or block having driving studs extending through said holes, extending across said split, positively but detachably connecting the ends of the rim, and containing a valve stem hole, for the purposes specified.

14. In a vehicle wheel, in combination, a transversely split tire carrying rim having sockets on either side of the split in said rim, and means detachable from said rim for uniting the ends of said rim, comprising a segmental bridge member having projections adapted to enter said sockets.

In testimony whereof, I have hereunto set my hand, this 9th day of June, 1910, in the presence of two subscribing witnesses.

ERLE K. BAKER.

Witnesses:
  EDWARD F. WILSON,
  M. SIMON.